(12) United States Patent
Wang (10) Patent No.: US 11,130,632 B2
(45) Date of Patent: Sep. 28, 2021

(54) STOCKER AND STOCKING SYSTEM (71) Applicants: HKC Corporation Limited, Shenzhen (CN); Chongqing HKC Optoelectronics Technology Co., Ltd., Chongqing (CN)

(72) Inventor: Tiaohong Wang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 291 days.

(21) Appl. No.: 16/328,893

(22) PCT Filed: Mar. 30, 2018

(86) PCT No.: PCT/CN2018/081247
§ 371 (c)(1),
(2) Date: Feb. 27, 2019

(87) PCT Pub. No.: WO2019/136836
PCT Pub. Date: Jul. 18, 2019

(65) Prior Publication Data
US 2020/0010272 A1    Jan. 9, 2020

(30) Foreign Application Priority Data
Jan. 9, 2018  (CN) .......................... 201810018760.3

(51) Int. Cl.
*H02J 50/80*   (2016.01)
*B65G 1/137*   (2006.01)
(Continued)

(52) U.S. Cl.
CPC ......... *B65G 1/137* (2013.01); *H01F 27/2876* (2013.01); *H01F 27/32* (2013.01);
(Continued)

(58) Field of Classification Search
USPC ....................................................... 320/108
See application file for complete search history.

(56) References Cited

U.S. PATENT DOCUMENTS

2018/0181095 A1* 6/2018 Funk .................... G05B 19/048

FOREIGN PATENT DOCUMENTS

| CN | 104852437 A | 8/2015 |
| CN | 105515106 A | 4/2016 |

(Continued)

*Primary Examiner* — Bryce M Aisaka
(74) *Attorney, Agent, or Firm* — Muncy, Geissler, Olds & Lowe, P.C.

(57) ABSTRACT

This application discloses a stocker and a stocking system. The stocker includes: a storage cabinet; a shelf, arranged inside the storage cabinet, where at least one charging module is arranged on the shelf; a first cassette, arranged on the shelf and capable of moving relative to the shelf; a monitoring apparatus, arranged inside the first cassette and configured to monitor cleanliness of air in the storage cabinet; and a battery apparatus, arranged inside the first cassette and configured to supply power to the monitoring apparatus, where the battery apparatus includes a battery and a charging receiver module connected to the battery, where when an electricity quantity of the battery is lower than a preset electricity quantity, the first cassette moves to a location corresponding to the charging module, so that the charging receiver module cooperates with the charging module to wirelessly charge the battery.

20 Claims, 4 Drawing Sheets (51) Int. Cl.
  *H01F 27/28*   (2006.01)
  *H01F 27/32*   (2006.01)
  *H01F 38/14*   (2006.01)
  *H01M 10/052*  (2010.01)
  *H01M 10/46*   (2006.01)
  *H02J 7/02*    (2016.01)

(52) U.S. Cl.
  CPC .......... *H01F 38/14* (2013.01); *H01M 10/052* (2013.01); *H01M 10/46* (2013.01); *H02J 7/025* (2013.01); *H02J 50/80* (2016.02); *H01M 2220/10* (2013.01)

(56) References Cited

FOREIGN PATENT DOCUMENTS

| | | |
|---|---|---|
| CN | 206389160 U | 8/2017 |
| CN | 107453453 A | 12/2017 |

* cited by examiner

STOCKER AND STOCKING SYSTEM

BACKGROUND

Technical Field

This application relates to the field of display apparatus manufacturing technologies, and in particular, to a stocker and a stocking system.

Related Art

In a process of manufacturing display apparatuses, a stocker (STK for short) is usually configured to stock array substrates, color film substrates, display panels, and the like. The stocker is an airtight environment, a plurality of cassettes (CSTs for short) is placed inside the stocker, and the cassettes are configured to accommodate a plurality of array substrates, a plurality of color film substrates, a plurality of display panels, and the like. To improve a yield of the display apparatuses and ensure product quality of the display apparatuses, a monitoring apparatus configured to monitor cleanliness of air in the stocker is usually placed in the stocker.

However, when a battery supplying power to the monitoring apparatus is low, maintenance personnel need to perform battery replacement manually. In a battery replacement process, external dust particles and the like are likely to enter the stocker, to pollute air in the stocker, and exert impact on quality of carried objects such as array substrates, color film substrates, and display panels. In addition, existing battery replacement manners also increase workloads of the maintenance personnel.

SUMMARY

Embodiments of this application provide a stocker and a stocking system, to reduce a possibility of dust particles entering the stocker during a battery charging process, thereby preventing air in the stocker from being polluted.

This application provides a stocker, comprising:
a storage cabinet;
a shelf, arranged inside the storage cabinet, where at least one charging module is arranged on the shelf;
a first cassette, arranged on the shelf and capable of moving relative to the shelf;
a second cassette, arranged on the shelf and capable of moving relative to the shelf, where the second cassette is configured to accommodate a carried object;
a monitoring apparatus, arranged inside the first cassette and configured to monitor cleanliness of air in the storage cabinet; and
a battery apparatus, arranged inside the first cassette and configured to supply power to the monitoring apparatus, where the battery apparatus comprises a polymer lithium battery and a charging receiver module and a detection module connected to the polymer lithium battery, and the detection module is configured to detect an electricity quantity of the polymer lithium battery, where
when the electricity quantity of the polymer lithium battery is lower than a preset electricity quantity, the first cassette moves to a location corresponding to the charging module, so that the charging receiver module cooperates with the charging module to wirelessly charge the polymer lithium battery.

This application further provides a stocker, comprising:
a storage cabinet;
a shelf, arranged inside the storage cabinet, where at least one charging module is arranged on the shelf;
a first cassette, arranged on the shelf and capable of moving relative to the shelf;
a monitoring apparatus, arranged inside the first cassette and configured to monitor cleanliness of air in the storage cabinet; and
a battery apparatus, arranged inside the first cassette and configured to supply power to the monitoring apparatus, where the battery apparatus comprises a battery and a charging receiver module connected to the battery; and
when an electricity quantity of the battery is lower than a preset electricity quantity, the first cassette moves to a location corresponding to the charging module, so that the charging receiver module cooperates with the charging module to wirelessly charge the battery.

In the stocker provided in this embodiment, the battery apparatus further comprises a detection module, and the detection module is connected to the battery and configured to detect the electricity quantity of the battery.

In the stocker provided in this embodiment, a communications apparatus is further comprised, the communications apparatus is arranged inside the first cassette, and is connected to the battery apparatus and the monitoring apparatus; and the communications apparatus is configured to send the electricity quantity of the battery detected by the detection module to a control terminal, so that when the electricity quantity of the battery is lower than the preset electricity quantity, the control terminal controls the first cassette to move to the location corresponding to the charging module.

In the stocker provided in this embodiment, the charging receiver module comprises an induction coil and a rectifying step-down unit connected to the induction coil, and the rectifying step-down unit is further connected to the battery.

In the stocker provided in this embodiment, the charging module comprises a transmit coil and a power supply control unit connected to the transmit coil, and the power supply control unit is further configured to connect to mains.

In the stocker provided in this embodiment, a heat dissipation apparatus is further comprised, and the heat dissipation apparatus is arranged inside the first cassette and configured to perform heat dissipation for the induction coil.

In the stocker provided in this embodiment, a heat insulation apparatus is further comprised, and the heat insulation apparatus is arranged inside the first cassette and configured to insulate the induction coil.

In the stocker provided in this embodiment, the shelf is a multi-layer shelf, and the charging module arranged on a lowest layer of the shelf.

This embodiment further provides a stocking system, comprising:
a stocker; and
a control terminal, where the control terminal establishes a communication connection to the stocker and is configured to control the stocker, where
the stocker is either of the stockers provided by this application.

This application provides a stocker and a stocking system. At least one charging module is arranged on a shelf of the stocker. A first cassette capable of moving relative to the shelf is further arranged on the shelf. A monitoring apparatus and a battery apparatus supplying power to the monitoring apparatus are arranged inside the first cassette. The battery apparatus comprises a battery and a charging receiver module connected to the battery. When an electricity quantity of the battery is lower than a preset electricity quantity, the first cassette moves to a location corresponding to the charging module, so that the charging receiver module cooperates with the charging module to wirelessly charge the battery. The stocker can effectively reduce a possibility of external dust particles and the like entering the stocker during a battery charging process and ensure quality of air in the stocker, thereby providing a good environment for generating a high-quality display apparatus. In addition, workloads of maintenance personnel can also be reduced.

BRIEF DESCRIPTION OF THE DRAWINGS

To illustrate the technical solutions of the embodiments of this application more clearly, the accompanying drawings for describing the embodiments are given briefly below. Apparently, the accompanying drawings in the following description are some embodiments of this application, and a person of ordinary skill in the art can derive other accompanying drawings from the accompanying drawings without creative efforts.

DETAILED DESCRIPTION

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Terms about directions mentioned in this application, such as "on", "below", "front", "back", "left", "right", "in", "out", and "side face", merely refer to directions in the accompanying drawings. Therefore, the used terms about directions are used to describe and understand this application, and are not intended to limit this application. In addition, in the accompanying drawings, similar or same structures are represented by same reference numerals.

Figure 1:
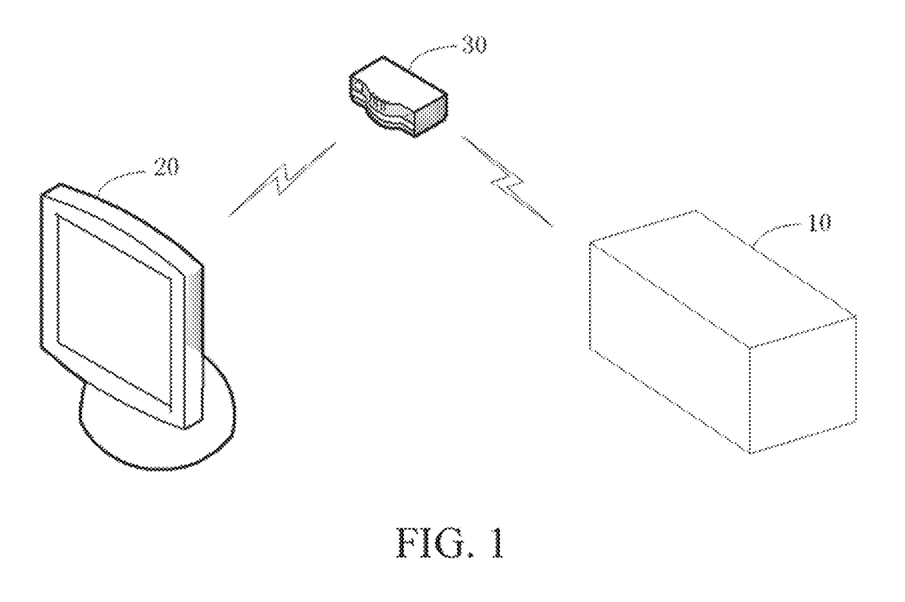
FIG. 1 is a schematic structural diagram of a stocking system according to an embodiment of this application.

FIG. 1 is a schematic structural diagram of a stocking system according to an embodiment of this application. The stocking system includes at least one stocker 10, a control terminal 20, and at least one router 30. The control terminal 20 is communicably connected to the stocker 10 through the router 30, and controls the stocker 10.

It should be noted that, in the stocking system shown in FIG. 1, only one stocker 10 and one router 30 are shown. It can be understood that when there are two or more stockers 10 and two or more routers 30, communicable connection relationships among other stockers 10, routers 30, and control terminals 20 can be easily reasoned according to a communicable connection manner shown in FIG. 1.

In an embodiment, the control terminal 20 may be a computer device such as a desktop computer or a tablet computer. The control terminal 20 is configured to generate a corresponding instruction based on data information sent by the stocker 10, and send the instruction to the stocker 10 through the router 30, to enable the stocker 10 to execute a corresponding action according to the instruction.

In the stocking system shown in FIG. 1, the router 30 is an external router of the stocker 10. It can be understood that router 30 may alternatively be arranged inside the stocker 10. In addition, it should be noted that a situation shown in FIG. 1 is one of various manners of establishing a communicable connection between the control terminal 20 and the stocker 10. No specific limitation is imposed on a manner of establishing a communicable connection between the control terminal 20 and the stocker 10.

In an embodiment, stockers 10 and routers 30 are in a one-to-one correspondence. To be specific, each stocker 10 corresponds to one router 30. It can be understood that each router 30 may alternatively correspond to a plurality of stockers 10. No specific limitation is imposed herein.

Figure 2:
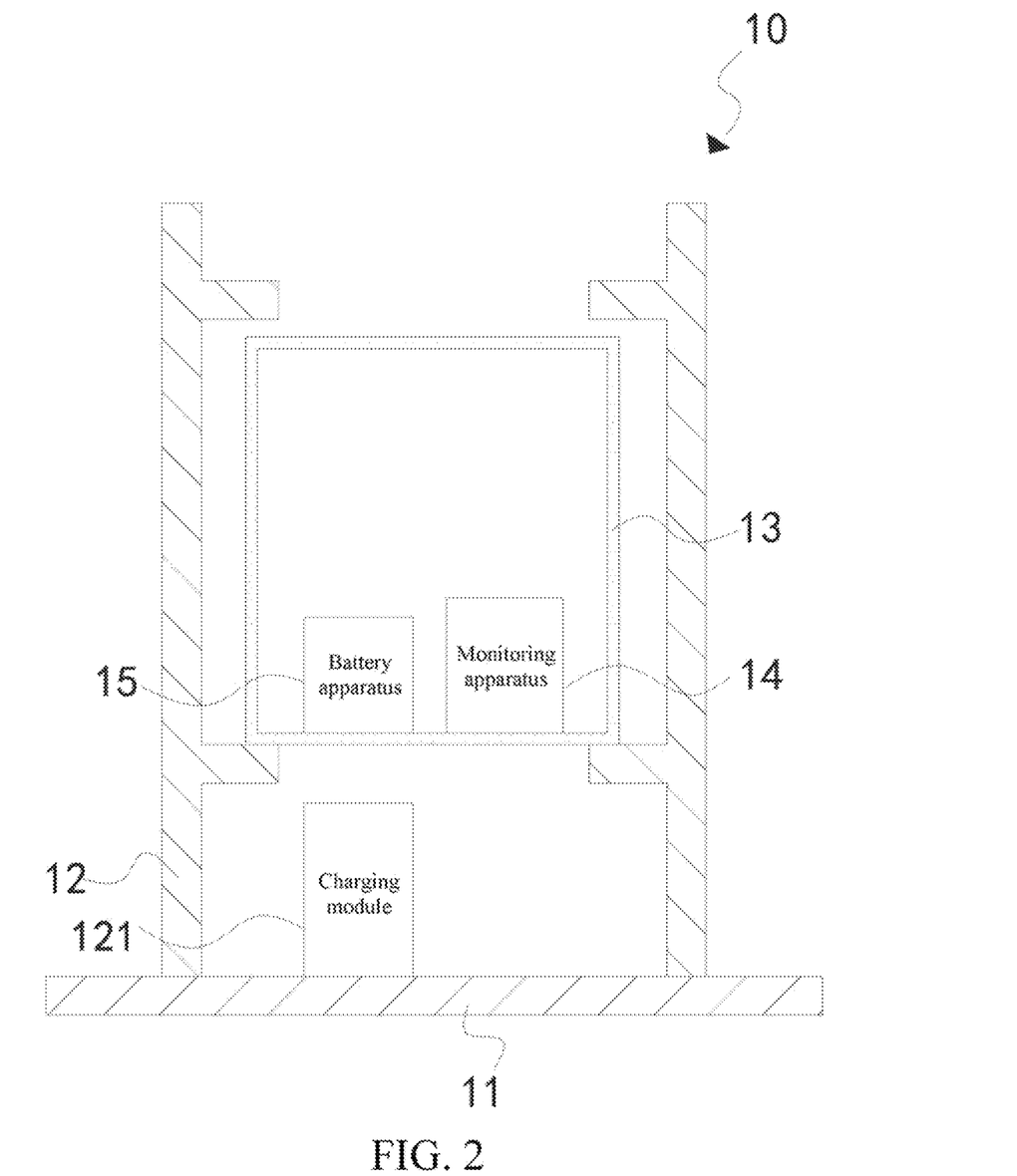
FIG. 2 is a schematic partial structural diagram of a stocker in the stocking system shown in FIG. 1.

FIG. 2 is a schematic partial structural diagram of a stocker in the stocking system shown in FIG. 1. The stocker 10 includes a storage cabinet 11, a shelf 12, a first cassette 13, a monitoring apparatus 14, and a battery apparatus 15.

The storage cabinet 11 is an airtight structure. Specifically, in an embodiment, the storage cabinet 11 includes a plurality of sidewalls, and the plurality of sidewalls encloses an airtight space. For example, as shown in FIG. 1, when the stocker 10 is rectangular, the storage cabinet 11 may include six sidewalls, where four sidewalls are connected to enclose a hollow square columnar structure, and two other sidewalls are respectively located on two ends of the columnar structure, to enclose, together with the columnar structure, an airtight space.

The shelf 12 is arranged inside the storage cabinet 11. At least one charging module 121 is arranged on the shelf 12. In an embodiment, the shelf 12 may be a multi-layer shelf. The charging module 121 may be arranged on a lowest layer of the shelf. In this way, when a problem, such as damage, occurs in the charging module 121, it is convenient for maintenance personnel to maintain the charging module 121. Certainly, in another embodiment, the charging module 121 may alternatively be placed at another location. No specific limitation is imposed herein.

The first cassette 13 is arranged on the shelf 12. The first cassette 13 is an open structure, including a frame and a base plate. The frame encloses a basic architecture of the first cassette 13, the base plate is arranged on a side face of the frame, and other side faces of the frame are all hollow structures. All devices in the first cassette 13 are placed on the base plate.

The first cassette 13 can move relative to the shelf 12. Specifically, in an embodiment, an actuating mechanism is arranged inside the stocker 10, and the control terminal 20 controls the actuating mechanism to actuate the first cassette 13 to move inside the stocker 10, so that the first cassette 13 moves relative to the shelf 12 and is placed on the corresponding shelf 12.

In an embodiment, there may be one or more first cassettes 13. No limitation is imposed herein.

The monitoring apparatus 14 is arranged inside the first cassette 13 and configured to monitor cleanliness of air in the storage cabinet 11. In an embodiment, the monitoring apparatus 14 may be a Particle Monitor System (PMS for short). The monitoring apparatus 14 is configured to monitor a status of particles, such as dust particles, in the storage cabinet 11.

In an embodiment, a memory is arranged inside the monitoring apparatus 14, and the monitoring apparatus 14 stores data information obtained through monitoring in the memory, and periodically automatically reads the data information from the memory and uploads it to the control terminal 20.

The battery apparatus 15 is arranged inside the first cassette 13, is connected to the monitoring apparatus 14, and is configured to supply power to the monitoring apparatus 14. Specifically, as shown in FIG. 3, the battery apparatus 15 includes a battery 151 and a charging receiver module 152 connected to the battery 151, and the battery 151 is connected to the monitoring apparatus 14 and configured to supply power to the monitoring apparatus 14.

In an embodiment, the battery 151 may be a polymer lithium battery. Certainly, the battery 151 may alternatively be a battery of another type. No specific limitation is imposed herein.

Figure 3:
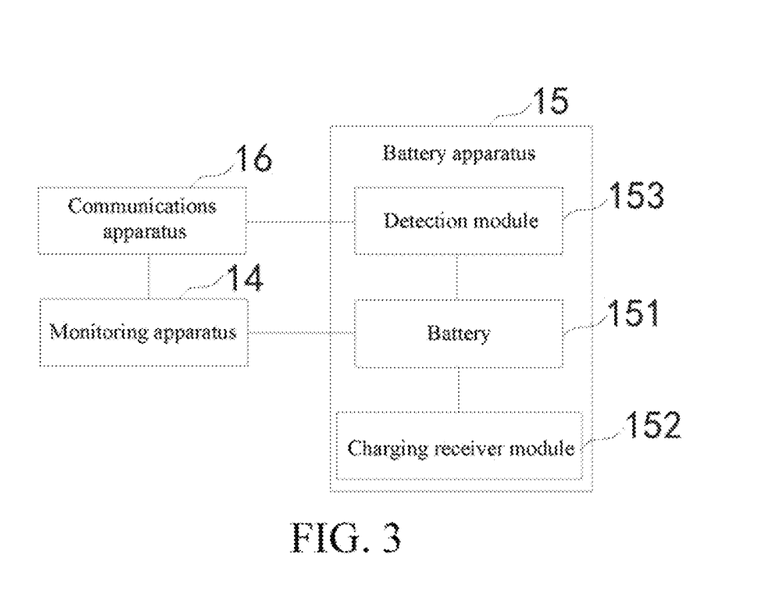
FIG. 3 is a schematic circuit structural diagram of a first cassette in the stocker shown in FIG. 2.

In the stocker 10 in this embodiment, as shown in FIG. 2 and FIG. 3, when the control terminal 20 detects that an electricity quantity of the battery 151 is lower than a preset electricity quantity, the control terminal 20 sends a control signal to the stocker 10, to enable the first cassette 13 to be moved to a location corresponding to the charging module 121, so that the charging receiver module 152 cooperates with the charging module 121 to wirelessly charge the battery 151.

In an embodiment, as shown in FIG. 3, the battery apparatus 15 further includes a detection module 153. The detection module 153 is connected to the battery 151 and configured to detect an electricity quantity of the battery 151 and transfer the detected electricity quantity to the control terminal 20 through the router 30, to enable the control terminal 20 to determine the electricity quantity of battery 151.

In an embodiment, the stocker 10 further includes a communications apparatus 16. The communications apparatus 16 is arranged inside the first cassette 13, and is connected to the battery apparatus 15. Specifically, the communications apparatus 16 is connected to the detection module 153 in the battery apparatus 15 and configured to send the electricity quantity of the battery 151 detected by the detection module 153 to the control terminal 20 through the router 30, so that when the electricity quantity of the battery 151 is lower than the preset electricity quantity, the control terminal 20 controls the first cassette 13 to move to a location corresponding to the charging module 121.

The communications apparatus 16 is further connected to the monitoring apparatus 14 and configured to send data information, such as cleanliness of air, obtained by the monitoring apparatus 14 through monitoring to the control terminal 20 through the router 30.

In an embodiment, the communications apparatus 16 may be a wireless transmitter. The communications apparatus 16 communicates with the control terminal 20 through the router 30.

Figure 4:
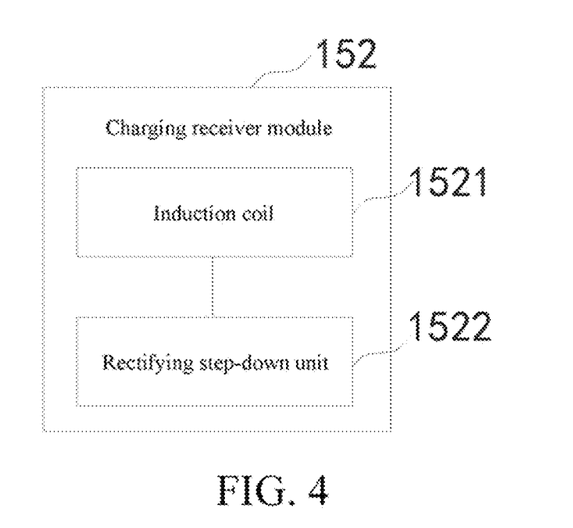
FIG. 4 is a schematic circuit structural diagram of a charging receiver module in a battery apparatus shown in FIG. 3.
Figure 5:
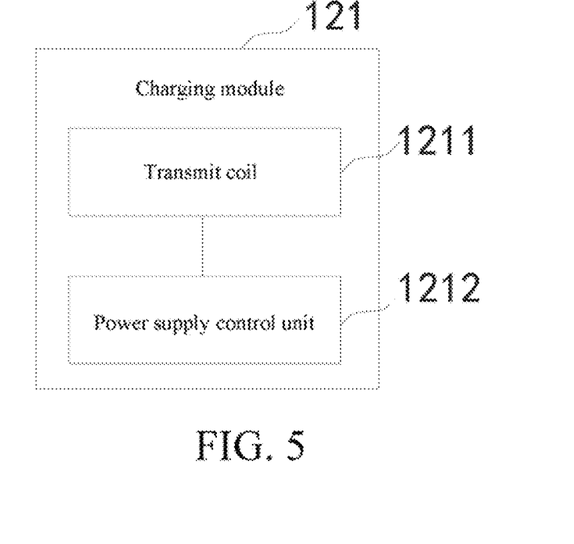
FIG. 5 is a schematic circuit structural diagram of a charging module in the stocker shown in FIG. 2.

In an embodiment, as shown in FIG. 4 and FIG. 5, the charging receiver module 152 includes an induction coil 1521 and a rectifying step-down unit 1522 connected to the induction coil 1521. The rectifying step-down unit 1522 is further connected to the battery 151. The charging module 121 includes a transmit coil 1211 and a power supply control unit 1212 connected to the transmit coil 1211. The power supply control unit 1212 is further configured to connect to mains.

The power supply control unit 1212 includes a rectifier unit, an inverter unit, and a switch unit. The control terminal 20 sends a control signal to the power supply control unit 1212, so that when the first cassette 13 moves to the location corresponding to the charging module 121, the switch unit is in a closed state, and in this case, the mains is converted through the rectifier unit, the inverter unit, and the like into an alternating current usable to the transmit coil 1211. After being electrified by an alternating current, the transmit coil 1211 generates a charging magnetic field. The induction coil 1521 cuts magnetic lines to generate an induced alternating current. The induced alternating current is converted into a direct current under the action of the rectifying step-down unit 1522 to wirelessly charge the battery 151.

It should be noted that in another embodiment, a manner of wirelessly charging the battery 151 by the charging module 121 in cooperation with the charging receiver module 152 is not limited to the foregoing electromagnetic induction wireless charging manner and may alternatively be other wireless charging manners. When other wireless charging manners are used, specific circuit structures of the charging module 121 and the charging receiver module 152 may be adjusted correspondingly.

In addition, in another embodiment, the power supply control unit 121 may not include a switch unit. To be specific, in this case, the transmit coil 1211 of the charging module 121 can be electrified by an alternating current continuously, that is, continuously transmits a charging magnetic field outward. When the first cassette 13 moves to a location corresponding to the charging module 121, the induction coil 1521 cuts magnetic lines to generate an induced alternating current, so as to wirelessly charge the battery 151.

In an embodiment, when the first cassette 13 moves to the location corresponding to the charging module 121, it needs to make the induction coil 152 be directed to the transmit coil 1211, to ensure maximized transmission of electric energy and improve energy conversion efficiency, thereby improving charging efficiency.

In an embodiment, because the induction coil 1521 needs to perform energy transmission to the transmit coil 1211, a base plate of the first cassette 13 is provided with a through-hole structure, the through-hole structure corresponds to the transmit coil 1211, and when the first cassette 13 moves to the location corresponding to the charging module 121, the induction coil 1521 in the first cassette 13 can correspond to the through-hole structure.

Because when a coil cuts magnetic induction lines, it is likely to generate a relatively large amount of heat. To avoid a fire, the stocker 10 further includes a heat dissipation apparatus. The heat dissipation apparatus is arranged inside the first cassette 13 and configured to perform heat dissipation for the induction coil 1521.

The heat dissipation apparatus may be a fan or another apparatus having a heat dissipation function. No limitation is imposed herein. Certainly, in another embodiment, another manner may alternatively be used to avoid a fire. For example, the stocker 10 further includes a heat insulation apparatus. The heat insulation apparatus is arranged inside the first cassette 13 and configured to insulate the induction coil 1521. The heat insulation apparatus may be a box body made of high-temperature-resistant heat insulation material, and the induction coil 1521 is accommodated inside the box body.

In an embodiment, the stocker 10 further includes at least one second cassette, the second cassette is arranged on the shelf 12 and capable of moving relative to the shelf 12, and the second cassette is configured to accommodate a carried object. Herein, the carried object may be an array substrate, a color film substrate, or a cell-formed display panel. The display panel is, for example, a liquid crystal display panel, an OLED display panel, a QLED display panel, a curved-surface display panel, or another display panel.

A stocking system in this embodiment employs the stocker 10 in this application, and at least one charging module 121 is arranged on a shelf 12 of the stocker 10. A first cassette 13 capable of moving relative to the shelf 12 is further arranged on the shelf 12. A monitoring apparatus 14 and a battery apparatus 15 supplying power to the monitoring apparatus 14 are arranged inside the first cassette 13. The battery apparatus 15 includes a battery 151 and a charging receiver module 152 connected to the battery 151. When an electricity quantity of the battery 151 is lower than a preset electricity quantity, the first cassette 13 moves to a location corresponding to the charging module 121, so that the charging receiver module 152 cooperates with the charging module 121 to wirelessly charge the battery 151, thereby effectively reducing a possibility of external dust particles and the like entering the stocker 10, and ensuring quality of air inside the stocker 10, to provide a good environment for producing a high-quality display apparatus. In addition, workloads of maintenance personnel can also be reduced, and costs can be reduced.

The foregoing descriptions are merely specific implementations of this application, but are not intended to limit the protection scope of this application. Any equivalent amendments or replacements readily figured out by a person skilled in the art within the technical scope disclosed in this application shall all fall within the protection scope of this application. Therefore, the protection scope of this application shall be subject to the protection scope of the claims.

What is claimed is:

1. A stocker, comprising:
   a storage cabinet;
   a shelf, arranged inside the storage cabinet, wherein at least one charging module is arranged on the shelf;
   a first cassette, arranged on the shelf and capable of moving relative to the shelf;
   a second cassette, arranged on the shelf and capable of moving relative to the shelf, wherein the second cassette is configured to accommodate a carried object;
   a monitoring apparatus, arranged inside the first cassette and configured to monitor cleanliness of air in the storage cabinet; and
   a battery apparatus, arranged inside the first cassette and configured to supply power to the monitoring apparatus, wherein the battery apparatus comprises a polymer lithium battery and a charging receiver module and a detection module connected to the polymer lithium battery, and the detection module is configured to detect an electricity quantity of the polymer lithium battery, wherein
   when the electricity quantity of the polymer lithium battery is lower than a preset electricity quantity, the first cassette moves to a location corresponding to the charging module, so that the charging receiver module cooperates with the charging module to wirelessly charge the polymer lithium battery.

2. A stocker, comprising:
   a storage cabinet;
   a shelf, arranged inside the storage cabinet, wherein at least one charging module is arranged on the shelf;
   a first cassette, arranged on the shelf and capable of moving relative to the shelf;
   a monitoring apparatus, arranged inside the first cassette and configured to monitor cleanliness of air in the storage cabinet; and
   a battery apparatus, arranged inside the first cassette and configured to supply power to the monitoring apparatus, wherein the battery apparatus comprises a battery and a charging receiver module connected to the battery, wherein
   when an electricity quantity of the battery is lower than a preset electricity quantity, the first cassette moves to a location corresponding to the charging module, so that the charging receiver module cooperates with the charging module to wirelessly charge the battery.

3. The stocker according to claim 2, wherein the battery apparatus further comprises a detection module, and the detection module is connected to the battery.

4. The stocker according to claim 3, wherein the detection module is configured to detect the electricity quantity of the battery.

5. The stocker according to claim 4, further comprising a communications apparatus, wherein the communications apparatus is arranged inside the first cassette, and is connected to the battery apparatus and the monitoring apparatus.

6. The stocker according to claim 5, wherein the communications apparatus is configured to send the electricity quantity of the battery detected by the detection module to a control terminal, so that when the electricity quantity of the battery is lower than the preset electricity quantity, the control terminal controls the first cassette to move to the location corresponding to the charging module.

7. The stocker according to claim 2, wherein the charging receiver module comprises an induction coil and a rectifying step-down unit connected to the induction coil, and the rectifying step-down unit is further connected to the battery.

8. The stocker according to claim 7, wherein the charging module comprises a transmit coil and a power supply control unit connected to the transmit coil, and the power supply control unit is further configured to connect to mains.

9. The stocker according to claim 7, further comprising a heat dissipation apparatus, wherein the heat dissipation apparatus is arranged inside the first cassette and configured to perform heat dissipation for the induction coil.

10. The stocker according to claim 7, further comprising a heat insulation apparatus, wherein the heat insulation apparatus is arranged inside the first cassette and configured to insulate the induction coil.

11. The stocker according to claim 2, wherein the shelf is a multi-layer shelf, and the charging module arranged on a lowest layer of the shelf.

12. A stocking system, comprising:
    a stocker, comprising:
    a storage cabinet;
    a shelf, arranged inside the storage cabinet, wherein at least one charging module is arranged on the shelf;
    a first cassette, arranged on the shelf and capable of moving relative to the shelf;
    a monitoring apparatus, arranged inside the first cassette and configured to monitor cleanliness of air in the storage cabinet; and
    a battery apparatus, arranged inside the first cassette and configured to supply power to the monitoring apparatus, wherein the battery apparatus comprises a battery and a charging receiver module connected to the battery; and
    a control terminal, wherein the control terminal establishes a communication connection to the stocker and is configured to control the stocker, wherein
    when an electricity quantity of the battery is lower than a preset electricity quantity, the first cassette moves to a location corresponding to the charging module, so that the charging receiver module cooperates with the charging module to wirelessly charge the battery.

13. The stocking system according to claim 12, wherein the battery apparatus further comprises a detection module, the detection module is connected to the battery, and the detection module is configured to detect the electricity quantity of the battery.

14. The stocking system according to claim 13, further comprising a communications apparatus, wherein the communications apparatus is arranged inside the first cassette, and is connected to the battery apparatus and the monitoring apparatus.

15. The stocking system according to claim 14, wherein the communications apparatus is configured to send the electricity quantity of the battery detected by the detection module to the control terminal, so that when the electricity quantity of the battery is lower than the preset electricity quantity, the control terminal controls the first cassette to move to the location corresponding to the charging module.

16. The stocking system according to claim 12, wherein the charging receiver module comprises an induction coil and a rectifying step-down unit connected to the induction coil, and the rectifying step-down unit is further connected to the battery.

17. The stocking system according to claim 16, wherein the charging module comprises a transmit coil and a power supply control unit connected to the transmit coil, and the power supply control unit is further configured to connect to mains.

18. The stocking system according to claim 16, further comprising a heat dissipation apparatus, wherein the heat dissipation apparatus is arranged inside the first cassette and configured to perform heat dissipation for the induction coil.

19. The stocking system according to claim 16, further comprising a heat insulation apparatus, wherein the heat insulation apparatus is arranged inside the first cassette and configured to insulate the induction coil.

20. The stocking system according to claim 12, wherein the shelf is a multi-layer shelf, and the charging module arranged on a lowest layer of the shelf.

* * * * *